United States Patent
Wehle et al.

(10) Patent No.: US 9,963,226 B2
(45) Date of Patent: May 8, 2018

(54) TAIL ASSEMBLY FOR A ROTORCRAFT, ROTORCRAFT AND METHOD OF MANUFACTURE OF A STRENGTHENED TAIL ASSEMBLY

(71) Applicant: AIRBUS HELICOPTERS DEUTSCHLAND GMBH, Donauworth (DE)

(72) Inventors: Christian Wehle, Augsburg (DE); Justus Steger, Neustadt A. D. Aisch (DE); Marc Nothen, Rain am Lech (DE); Stefan Probst, Buchdorf (DE); Antonia Horstmann, Dillingen (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 438 days.

(21) Appl. No.: 15/054,485

(22) Filed: Feb. 26, 2016

(65) Prior Publication Data
US 2016/0251080 A1    Sep. 1, 2016

(30) Foreign Application Priority Data

Feb. 27, 2015   (EP) .................................... 15400011

(51) Int. Cl.
*B64C 27/82*    (2006.01)
*B64C 27/20*    (2006.01)
*B64F 5/10*     (2017.01)

(52) U.S. Cl.
CPC .............. *B64C 27/82* (2013.01); *B64C 27/20* (2013.01); *B64F 5/10* (2017.01); *B64C 2027/8272* (2013.01)

(58) Field of Classification Search
CPC . B64C 2027/8236; B64C 27/10; B64C 27/14; B64C 27/82; B64C 27/20; B64F 5/10
See application file for complete search history.

(56) References Cited

U.S. PATENT DOCUMENTS

| 4,708,305 A | 11/1987 | Kelley et al. |
| 4,809,931 A * | 3/1989 | Mouille ................. B64C 27/82 |
| | | 244/17.11 |

(Continued)

FOREIGN PATENT DOCUMENTS

| CA | 2821443 | 1/2014 |
| CN | 1036182 A | 10/1989 |

(Continued)

OTHER PUBLICATIONS

European Search Report for European Application No. 15400011.1, Completed by the European Patent Office on Jul. 13, 2015, 6 Pages.

(Continued)

*Primary Examiner* — Justin M Benedik
(74) *Attorney, Agent, or Firm* — Brooks Kushman P.C.

(57) ABSTRACT

A tail assembly for a rotorcraft. The tail assembly is manufactured to include at least one transition structure provided in the tail assembly. The transition structure is longitudinally arranged between a longitudinal median boom portion and a tail fin. A power transmission shaft of the rotorcraft extends at least partly externally above a longitudinal median boom portion of the tail assembly. The transition structure includes at an entering region a cut-out elevation step, where is made a passing through opening for the power transmission shaft.

20 Claims, 4 Drawing Sheets

(56) References Cited

U.S. PATENT DOCUMENTS

| | | | | |
|---|---|---|---|---|
| 4,927,331 A * | 5/1990 | Vuillet | ............... | B64C 11/18 416/238 |
| 5,102,067 A * | 4/1992 | Weiner | ............... | B64C 27/82 244/17.19 |
| 5,108,044 A * | 4/1992 | Weiner | ............... | B64C 27/82 244/130 |
| 5,209,430 A * | 5/1993 | Wilson | ............... | B64C 23/00 244/17.11 |
| 5,251,847 A * | 10/1993 | Guimbal | ............... | B64C 27/14 244/17.19 |
| 5,306,119 A * | 4/1994 | Bandoh | ............... | B64C 11/00 415/119 |
| 2006/0169835 A1* | 8/2006 | Maille | ............... | B29C 70/342 244/17.19 |
| 2009/0277991 A1* | 11/2009 | Mikulla | ............... | B64C 27/82 244/17.21 |
| 2014/0197271 A1* | 7/2014 | Maloney | ............... | B60N 2/4242 244/17.21 |

FOREIGN PATENT DOCUMENTS

| | | |
|---|---|---|
| DE | 202012002493 | 6/2012 |
| EP | 0562527 A1 | 9/1993 |
| FR | 2167249 | 8/1973 |
| RU | 2206475 | 6/2003 |

OTHER PUBLICATIONS

First Office Action for Chinese Application No. 201610107175.1, dated Aug. 28, 2017, 8 Pages.

* cited by examiner

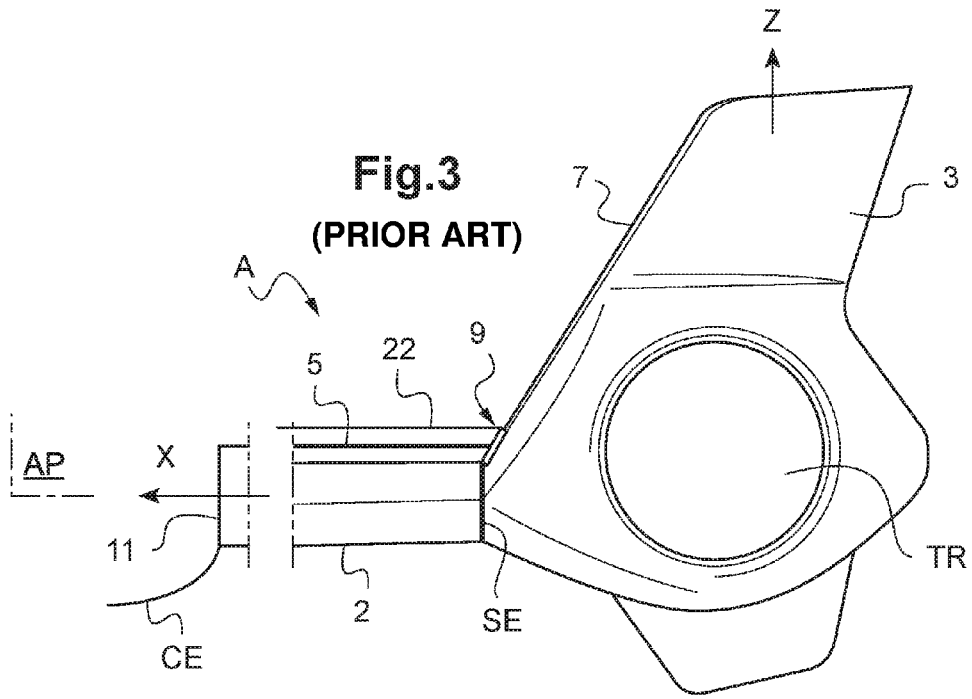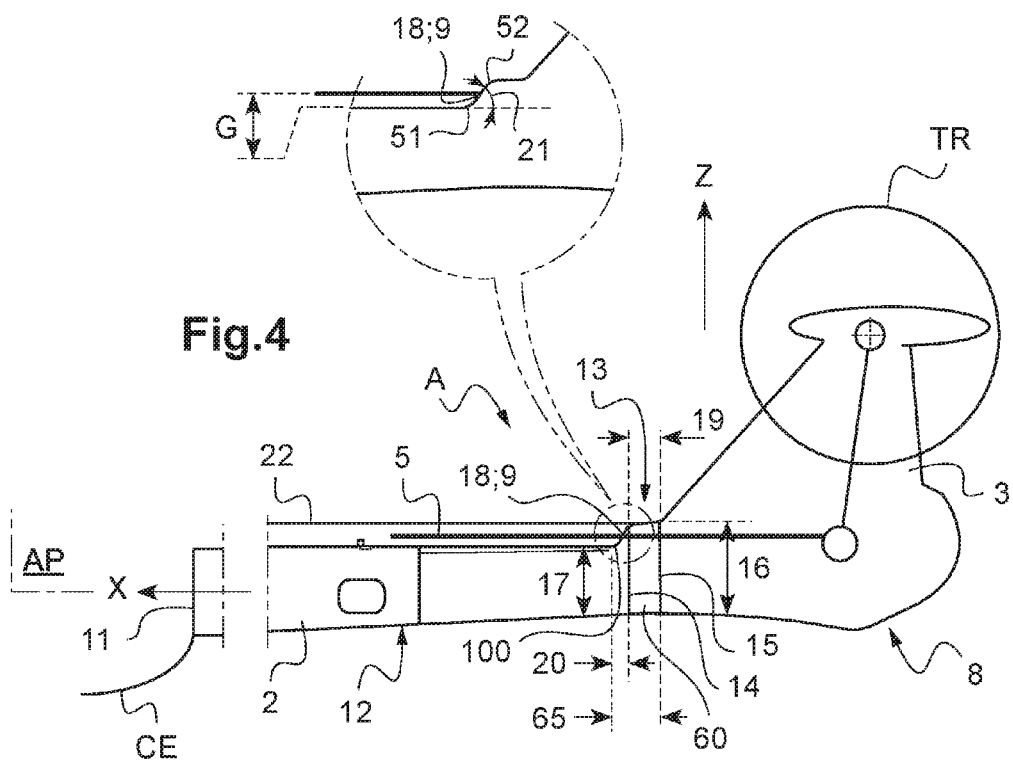

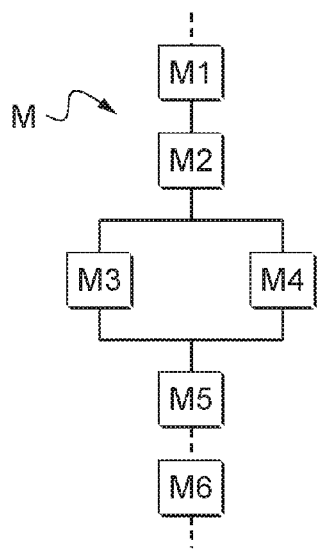
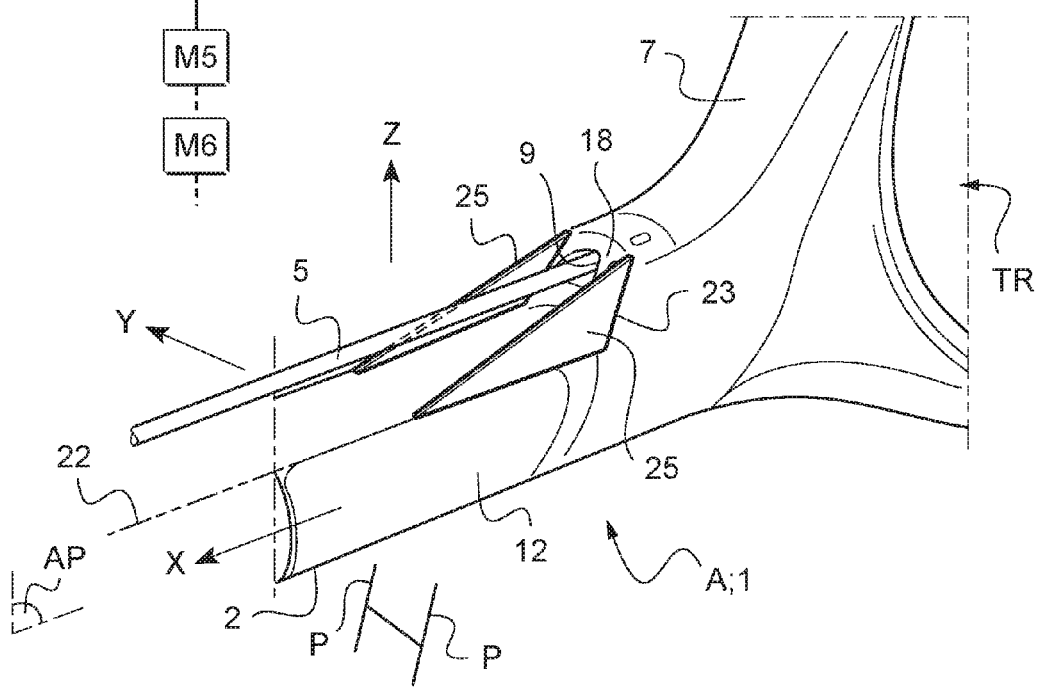
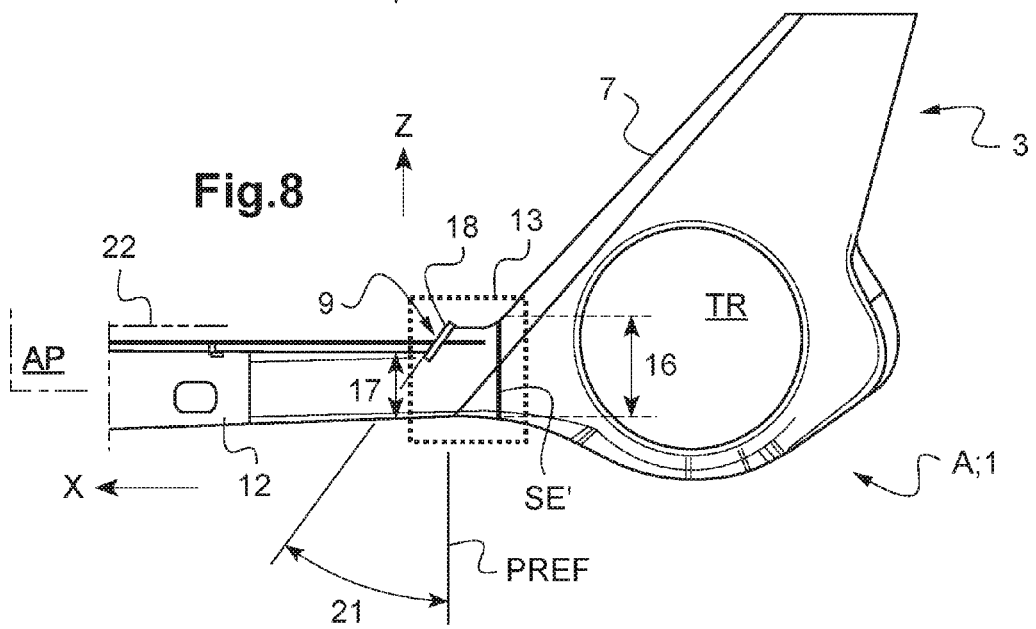

TAIL ASSEMBLY FOR A ROTORCRAFT, ROTORCRAFT AND METHOD OF MANUFACTURE OF A STRENGTHENED TAIL ASSEMBLY

CROSS REFERENCE TO RELATED APPLICATION

This application claims priority to European patent application No. EP 15400011.1 filed on Feb. 27, 2015, the disclosure of which is incorporated in its entirety by reference herein.

BACKGROUND OF THE INVENTION (1) Field of the Invention

The present invention relates to a tail assembly for a rotorcraft, a rotorcraft and a method to manufacture a strengthened tail assembly. More particularly, the invention relates to a tail assembly for a helicopter.

Thus, the invention belongs to the technical field of rotorcraft tail assemblies.

(2) Description of Related Art

A rotorcraft has at least one main rotor mechanically driven by at least one engine. Such main rotor provides the rotorcraft with lift and possibly with propulsion.

The main rotor is carried by a cell including a tail assembly. This tail assembly comprises a tail boom, the tail boom carrying a vertical aerodynamic stabilizer which is also named "tail fin" or "fin" by the one skilled in the art. The tail assembly can also be provided with at least one aerodynamic stabilizer arranged horizontally and carried by the tail boom or by the tail fin.

The tail assembly of a rotorcraft is also provided with a tail rotor that performs an anti-torque function so as to compensate for the yaw torque created by the rotation of the main rotor, the tail rotor exerting thrust transversely. Furthermore, the tail rotor enables the pilot of the rotorcraft to control yaw and command steering movements of the rotorcraft by exerting positive or negative transverse thrust.

The tail rotor can be a non-ducted tail rotor referred to as a "conventional" tail rotor, for convenience. Conventionally, the non-ducted tail rotor is mounted on one lateral side near a top end of the tail fin or on one end of the tail boom of the rotorcraft.

Such a non-ducted tail rotor is in widespread use. Nevertheless, a ducted tail rotor can also be implemented, such ducted tail rotors being commonly known under the trademark Fenestron®.

A ducted tail rotor comprises a rotor arranged in a passage formed through the vertical tail fin of a helicopter, the axis of symmetry of the passage being substantially perpendicular to the vertical anteroposterior plane of symmetry of the rotorcraft. As a result, the streamlined structure of the tail fin surrounds said passage and thus the tail rotor. Consequently, the wall of the passage itself is also known to the person skilled in the art as a "duct" or "shroud", which explains why it is referred to as a "ducted tail rotor" or a "shrouded tail rotor".

Moreover, rotorcrafts require a lightweight structure to maximize the useful load that can be carried. This goal is achieved by the use of lightweight materials with high strength per weight and a structure designed so as to provide optimized load paths and stress distribution.

Nevertheless, the interface zone between the tail fin and the tail-boom is an area where such a strength and light weight design is difficult to achieve. This is even harder to achieve when the tail rotor is ducted and arranged in this tail fin.

Indeed, a tail boom is provided with a cross section made as small as possible to limit the aerodynamic interaction with the flow of air coming from the main rotor. The cross section of the tail boom is additionally constraint by the required clearances to the main rotor, flare maneuvers and rear access to the helicopter.

Conversely, a tail fin and in particular a tail fin provided with a ducted tail rotor is provided with a larger section. The cross section of the tail fin of a ducted tail rotor is made larger than the cross section of the tail boom in order to be able to host the tail rotor, both in transverse and mostly upwards directions. The tail fin as a vertical aerodynamic surface equally requires a long and thin cross section for involving an optimum effect.

So, the tail fin which presents large cross-section interfaces in the interface zone with the tail boom which conversely has a small cross-section at a sharp corner. The sudden change of cross-sections at a sharp corner between the tail boom and the tail fin is known to result in stress concentrations in the structure in the region of the interface zone. The interface zone represents the highest stress concentration zone in the tail assembly.

Moreover, the rotorcraft is provided with a power transmission shaft which links the tail rotor to a power plant to drive in rotation said tail rotor.

The power transmission shaft can be arranged above the tail boom for maintenance purpose. Indeed, if the power transmission shaft was arranged in the tail boom, the access to this power transmission shaft would be difficult.

So the power transmission shaft is often extending longitudinally along and above the tail boom.

According to the document DE202012002493 for example, the leading edge of the tail fin is consequently cut-out in the area of the interface zone to provide an aperture in the tail fin. The power transmission shaft then penetrates into the tail fin through the cut-out of the leading edge of the tail fin to reach the tail rotor.

Such cut-out for the tail rotor power shaft is located right beside or in the interface zone, further increasing the stress concentration in this interface zone.

Consequently, the interface zone can require to be strengthened to be sufficiently stable. In this situation, the interface zone can require stronger sizing of its structure and is therefore weight intensive.

It would therefore be desirable to design an alternative tail assembly.

In order to avoid a high stress concentration in the interface zone, the tail boom diameter can be increased to reduce the stress concentration in this interface zone. Nevertheless, an increase of the tail-boom dimensions upwards would decrease the clearance to the main-rotor introducing weight penalties in form of a longer rotor mast with corresponding higher bending loads. An increase of the tail boom dimensions downwards would decrease the space below the tail boom needed for flare clearance or loading. Consequently, such solutions can lead to a weight increase.

The installation of the power transmission shaft inside the tail boom can increase the interface cross-section between the tail fin and the tail boom, by the utilization of the height used conventionally for the power transmission shaft above the tail boom. Nevertheless, this solution limits accessibility to the power transmission shaft and therefore complicates maintenance and installation process.

The documents CA2821443, RU2206475, U.S. Pat. No. 5,209,430, U.S. Pat. No. 5,108,044 and U.S. Pat. No. 4,708,305 are also known but are far from the invention technical problem and domain.

The document CA2821443 describes a system and a method to control fuselage torque of an aircraft. A tail boom has a first surface that creates a high-pressure region in a downward wash by the rotor and a second surface that creates a low-pressure region in the downward wash by the rotor.

A tail rotor power shaft can extend in the tail boom.

The document RU2206475 describes a tail boom provided with three or more longitudinal planes to enhance the efficiency of tail assembly.

U.S. Pat. No. 5,209,430 describes a system to improve yaw control on a rotorcraft at low speed. This system includes strakes arranged on a tail boom.

A tail rotor power shaft can be arranged on the top of the tail boom and can be covered with a tail rotor shaft cover.

U.S. Pat. No. 4,708,305 is also showing a tail boom provided with strakes.

U.S. Pat. No. 5,108,044 shows a ducted tail rotor. The ducted tail rotor includes a shroud integral with a tail boom, a tail rotor power shaft being arranged continuously inside the tail boom and then the shroud.

Other documents are cited, i.e. U.S. Pat. No. 4,809,931, U.S. Pat. No. 4,927,331, FR2167249, U.S. Pat. No. 5,251,847 and U.S. Pat. No. 5,306,119.

BRIEF SUMMARY OF THE INVENTION

In this context, the invention concerns a method of manufacturing a rotorcraft with notably the features of claim 1, a tail assembly with notably the features of claim 6, and a rotorcraft with the features of claim 15.

According to the invention, an object is a method of manufacturing a tail assembly for a rotorcraft. The tail assembly includes a load bearing structure defining, from fore to aft, a tail boom and a tail fin; the load bearing structure having a fore end and a longitudinal median boom portion extending from the fore end towards the tail fin. The tail assembly comprises a power transmission shaft penetrating inside the tail fin by a passing through opening in the load bearing structure. The passing through opening faces forwards longitudinally the fore end. In preferred embodiments, the method includes:

a transition stage of providing the tail assembly with at least one transition structure that is longitudinally arranged between the longitudinal median boom portion and the tail fin; at least one transverse section of the transition structure having an upwards dimension that is higher than an elevation junction dimension of the longitudinal median boom portion at a junction between the longitudinal median boom portion and the transition structure;

a cut-out arrangement stage of providing the transition structure with at least one cut-out elevation step, the passing through opening being made in said cut-out elevation step, such that the power transmission shaft extends at least partly externally above the longitudinal median boom portion between the fore end and the cut-out elevation step, the power transmission shaft penetrating in the load bearing structure through the passing through opening;

an upper location stage of determining a longitudinal distance shift at which an upper end of the cut-out elevation step is longitudinally shifted forwards relative to a leading edge of the tail fin; and a lower offset stage of a lower offset at which a lower end of the cut-out elevation step is longitudinally shifted forwards with respect to the upper end of the cut-out elevation step.

So, the tail assembly is extending along a longitudinal direction from the fore end towards a rear end located on the tail fin.

The expression "transverse section" designates a section of a member which is arranged in a transverse plane substantially orthogonal to the longitudinal direction.

The expression "upwards dimension" refers to the maximal height of a transverse section along an elevation direction, said elevation direction being contained in the transverse plane and being orthogonal to the longitudinal direction.

The expression "elevation junction dimension" refers to the upwards dimension of a particular transverse section of the longitudinal median boom portion, which is the section at the junction between the longitudinal median boom portion and the transition structure.

All the transverse sections of the transition structure can have an upwards dimension higher than the elevation junction dimension.

Consequently, the transition structure comprises an inclined cut-out elevation step to reach the transverse sections having the highest upwards dimensions.

So, the invention uses a transition structure which represents a smooth transition between the tail fin and the tail-boom thereby reducing the stress concentration.

Indeed, a transition structure having a higher dimension in elevation results in less stress concentration in the area of the tail fin attachment, and therefore a lighter weight and less stress induced issues.

The longitudinal forward shift of the cut-out elevation step may allow a larger and therefore stress optimized corner radius between the transition structure and the tail fin.

Moreover, the passing through opening is not made in the tail fin leading edge, but in a cut-out elevation step which is forwardly offset with regards to this leading edge. This passing through opening induces a stress concentration at the smaller, and therefore less stress concentrating, cross section change.

The power transmission shaft is running inside the tail assembly for only a limited length. So the consequences of this feature on the maintenance are limited.

According to an embodiment, a longitudinal dimension of the transition structure, from the junction to the tail fin leading edge, is comprised between 0.05 m (meter) and 0.4 m, and in particular is close to 0.1 m. A longer distance allows a smoother and less abrupt transition between the tail fin and the longitudinal median boom portion with therefore better stress properties.

The expression "longitudinal dimension" refers to the dimension of the transition structure along the longitudinal direction.

According to an embodiment, the upper end of the cut-out elevation step is linked to a longitudinal part of the transition structure, the longitudinal part extending from the cut-out elevation step towards the leading edge of the tail fin.

The longitudinal dimension of the transition structure is equal to the sum of the longitudinal dimension of the cut-out elevation step and of the longitudinal dimension of the longitudinal part.

The upwards dimension of the transverse sections of the longitudinal part can be constant, or can increase smoothly from the upper end of the cut-out elevation step to the tail fin.

However for improving the strength of such a tail assembly, it is preferred to have a smooth increase of the upwards dimension of the transverse sections of the longitudinal part from the upper end of the cut-out elevation step to the tail fin According to an embodiment, the method may include an angle affecting stage which consists in providing a front-downwards/rear-upwards cut-out angle according to which the cut-out elevation step is bent with respect to a transverse reference plane that is parallel to a transverse direction of the tail assembly and orthogonal to a longitudinal direction of the tail assembly; the cut-out angle being comprised between 1 degree and 70 degrees.

According to an embodiment, the method may include a reinforcement stage during which stage at least two reinforcement ribs are secured to the longitudinal median boom portion and to the cut-out elevation step, with the power transmission shaft extending between the ribs. The method includes a stage of determining a lateral position of each reinforcement rib including a sideward spacing value between the power transmission shaft and the corresponding reinforcement rib.

Ribs may be added to the left and right of the cut-out elevation step to further reduce the stiffness differential between the cross-sections forward and aft of the cut-out elevation step.

The transition structure can also be equipped with structural frames arranged inside this transition structure.

Another object of the invention is a tail assembly for a rotorcraft; the tail assembly including a load bearing structure defining, from fore to aft, a tail boom and a tail fin; the load bearing structure having a fore end and a longitudinal median boom portion extending from the fore end towards the tail fin; the tail assembly comprising a power transmission shaft which penetrates inside the tail fin by a passing through an opening in the load bearing structure. The passing through opening faces forward longitudinally the fore end.

An embodiment provides that the tail assembly includes: at least one transition structure provided in the tail assembly; the transition structure being longitudinally arranged between the longitudinal median boom portion and the tail fin; at least one transverse section of the transition structure having an upwards dimension that is higher than an elevation junction dimension of the longitudinal median boom portion at a junction between the longitudinal median boom portion and the transition structure; at least one cut-out elevation step being arranged on the transition structure, the passing through opening being made in said cut-out elevation step, such that the power transmission shaft extends at least partly externally above the longitudinal median boom portion, between the fore end and the cut-out elevation step, the power transmission shaft penetrating in the load bearing structure through the passing through opening; the cut-out elevation step having an upper end which is longitudinally shifted forwards relative to a leading edge of the tail fin, the cut-out elevation step having a lower end which is longitudinally shifted forwards with respect to the upper end.

According to an embodiment, the tail assembly includes an external tail rotor.

According to an embodiment, the tail assembly includes a ducted tail rotor and/or the transition structure secures at least partly a plurality of lateral stabilization airfoils extending outwards on both sides of the tail assembly.

According to an embodiment, the transition structure is at least partly a part of the longitudinal median boom portion.

According to an embodiment, the transition structure is at least partly a part of the tail fin.

According to an embodiment, the cut-out elevation step is bent with respect to a transverse reference plane that is parallel to a transverse direction of the tail assembly and orthogonal to a longitudinal direction of the tail assembly by a front-downwards/rear-upwards cut-out angle according to which the cut-out angle being comprised between 1 degree and 70 degrees.

According to an embodiment, the upper end of the cut-out elevation step is linked to a longitudinal part of the transition structure, the longitudinal part extending from the cut-out elevation step towards the leading edge of the tail fin.

According to an embodiment, the power transmission shaft may be covered by at least one non load-bearing fairing; the non load-bearing fairing being shaped with a horseshoe section perpendicularly to the longitudinal direction of the rotorcraft and/or having at least one slanted fore and/or aft edge which could have an angle slightly equal to the cut-out angle of the cut-out elevation step.

According to an embodiment, the non load-bearing fairing may be detachably secured to the longitudinal median boom portion for allowing access to the power transmission shaft.

If any, the non load-bearing fairing is flush with a longitudinal part of the transition structure Another object of the invention is a rotorcraft including at least one tail assembly as exposed above. The rotorcraft can be chosen among: helicopters, hybrid rotary aircrafts; UAV rotorcrafts and inhabitable rotorcrafts including remote piloting functions.

A short description of the drawings follows.

BRIEF DESCRIPTION OF THE SEVERAL VIEWS OF THE DRAWINGS

Presently preferred embodiments of the invention are presented in the following description with reference to the attached drawings.

FIG. 3 is a part lateral view of a tail assembly of the prior art, where the interface zone between the tail fin and the tail boom is in close proximity with the area where a power transmission shaft penetrates inside the tail fin.

FIG. 4 is a part lateral view of a rotorcraft having a tail assembly according to an embodiment of the invention, the tail assembly comprising a conventional tail rotor.

FIGS. 5, 6, 7, 8 are schematic views of another embodiment of the invention where the tail rotor is ducted to form a Fenestron®.

FIG. 9 is used to explicit the method of the invention.

DETAILED DESCRIPTION OF THE INVENTION

Some figures show three mutually orthogonal directions X, Y and Z. The directions X, Y and Z together define a referential XYZ.

A reference direction X referred to as being longitudinal corresponds to the length dimension of the aircrafts described. Terms such as front/rear fore/aft are relative thereto. The longitudinal direction X is deemed to be parallel to a roll axis of the aircraft.

Another direction Y, said to be "transverse", corresponds to the thickness or lateral dimension of the structures described. The terms side or left/right or port/starboard are relative thereto. For instance, a controlled airflow by a counter torque tail rotor is considered as being mainly directed along this direction Y. This direction Y is deemed here as being parallel to a pitch axis of the aircraft.

Another direction Z is referred to as the elevation or upwards direction. The direction Z corresponds to the radial length/height of the structures described. Here, the direction Z is deemed as being parallel to a yaw axis of the aircraft.

Together, the longitudinal direction X and the elevation direction Z define the anteroposterior plane AP of the rotorcraft A. The anteroposterior plane AP of the rotorcraft A is the upwards and transversally median plane that divides the rotorcraft A in two lateral halves, i.e. the port side and the starboard side or left and right sides.

Figure 1:
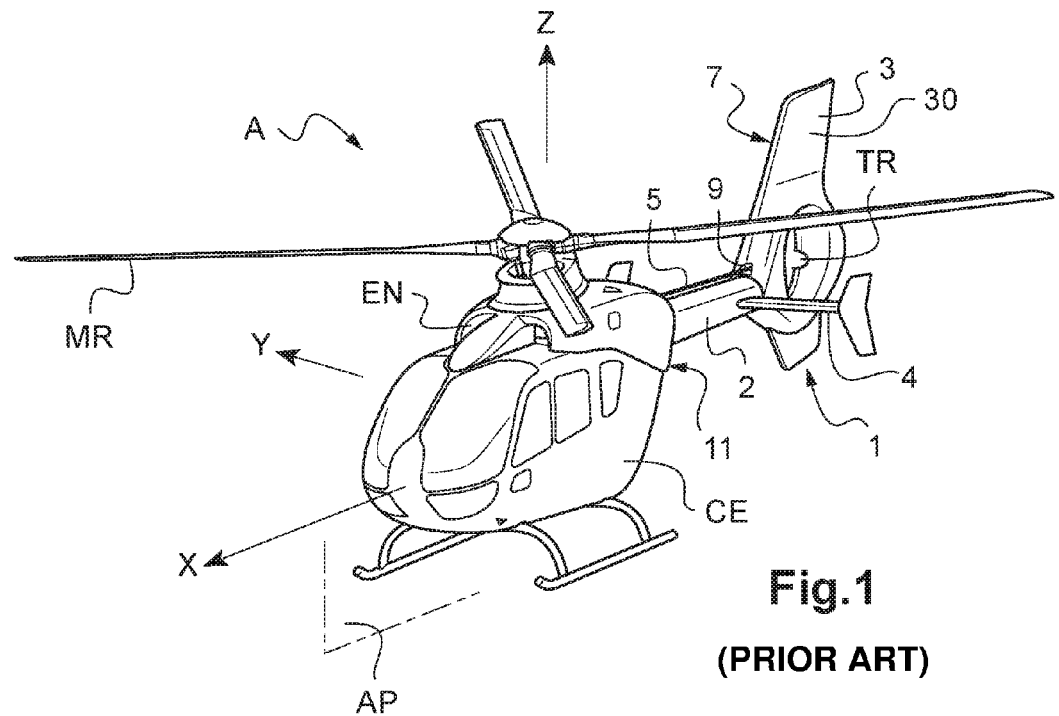
FIG. 1 is a schematic perspective view of a rotorcraft of the prior art.

On the FIG. 1, an aircraft of the prior art is illustrated, the aircraft being a rotorcraft A, such as a helicopter provided with a main rotor MR.

The rotorcraft A has at least one main rotor MR mechanically driven by at least one engine EN. Such a main rotor provides to the rotorcraft A with lift and possibly propulsion.

The main rotor MR is carried by a cell CE including a tail assembly 1. This tail assembly 1 comprises a tail boom 2, the tail boom 2 carrying a vertical aerodynamic stabilizer 30 which is also named "tail fin" or "fin" 3 by the one skilled in the art.

The tail assembly 1 is also provided with at least one aerodynamic stabilizer 4 arranged horizontally and carried by the tail boom 2 or by the tail fin 3.

The tail assembly 1 is further provided with a tail rotor TR that performs an anti-torque function so as to compensate for the yaw torque created by the rotation of the main rotor MR. The tail rotor TR exerts thrust transversely, i.e. generally along the direction Y. Furthermore, the tail rotor TR enables a pilot (not shown) of the rotorcraft A to control yaw and steering movements of the rotorcraft A, by exerting positive or negative transverse thrust.

A ducted tail rotor comprises a rotor arranged in a duct formed from side to side through the vertical tail fin 3, the axis of symmetry of the duct being substantially perpendicular to the vertical anteroposterior plane of symmetry of the rotorcraft A.

As explained, in nowadays rotorcrafts, the interface zone between the tail fin and the tail-boom is an area where a strength and light weight design is difficult to achieve, especially when the tail rotor TR is ducted and arranged in this tail fin. Indeed, a power transmission shaft 5 that is mechanically driven by the engine EN, enters in the tail fin 3.

Figure 2:
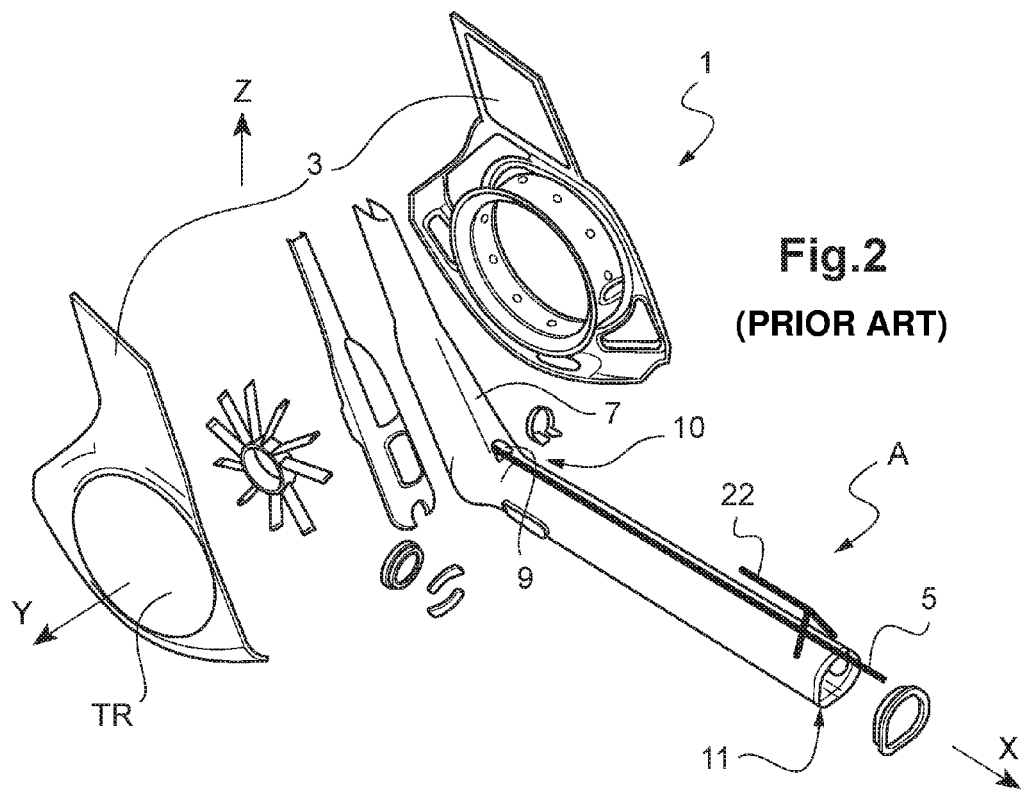
FIG. 2 is a split perspective downwards, front and lateral view of a prior art tail assembly for a rotorcraft, such as described in the prior art document DE202012002493, with a tail rotor driven through a power transmission shaft that is longitudinally extending outside and above the tail boom structure properly and that penetrates inside a ducted tail fin.

According to the FIG. 2, a passing through opening 9 is directly made in the leading edge 7 of the tail fin 3, in a sharp corner 10 arranged between the tail boom 2 and a part of the tail fin 3.

On FIG. 3, the tail boom 2 of the prior art has a direct transition section SE with the tail fin 3 in which the stress are highly concentrated.

The FIG. 4 shows a rotorcraft A of the invention. The rotorcraft A is provided with a cell CE, at least an engine EN, and at least a main rotor MR.

Moreover, the tail assembly 1 of the invention includes a load bearing structure 8. This load bearing structure 8 defines, from fore to aft, the tail boom 2 and the tail fin 3 of the rotorcraft A.

The load bearing structure 8 has a fore end 11. The load bearing structure 8 has a longitudinal median boom portion 12 extending from the fore end 11 towards the tail fin 3.

According to the invention, the tail assembly 1 includes at least one transition structure 13. Compared with the FIG. 3, the transition structure 13 offers a more smooth, continuous and progressive transition, between the longitudinal median boom portion 12 and the tail fin 3, than section SE.

Depending on embodiments, the transition structure 13 is at least partly a part of the longitudinal median boom portion 12. In embodiments, the transition structure 13 is at least partly a part of the tail fin 3. In some rotorcrafts A, the transition structure 13 is both partly defined by the longitudinal median boom portion 12 and partly defined by the tail fin 3.

The transition structure 13 is longitudinally arranged between the longitudinal median boom portion 12 and the tail fin 3. At least one transverse section 14, 15 of the transition structure 13 have an upwards dimension 16 that is higher than an elevation junction dimension 17 of the longitudinal median boom portion 12 at the junction 100 between this longitudinal median boom portion 12 and the transition structure 13.

For example, all the transverse sections of a longitudinal part 60 of the transition structure 13 have an upwards dimension 16 that is higher than an elevation junction dimension 17.

Also, at least one cut-out elevation step 18 is arranged on the transition structure 13. In such a manner, the power transmission shaft 5 extends at least partly externally above, with an elevation gap G, the boom portion 12.

The cut-out elevation step 18 is provided with an inclined surface extending backwards in elevation from a lower end 51 to an upper end 52. The cut-out elevation step may extend longitudinally from the junction 100 towards the longitudinal part 60. So, the upper end can be linked to the longitudinal part 60.

A longitudinal distance shift 19 separates longitudinally the upper end 52 of the cut-out elevation step 18 from the leading edge 7 of the tail boom.

The longitudinal distance shift 19 represents the length of the longitudinal part 60 along the longitudinal direction X.

A lower offset 20 separates longitudinally the lower end 51 and the upper end 52. The lower offset 20 represents the length of the cut-out elevation step along the longitudinal direction X.

So the longitudinal dimension 65 of the transition structure is equal to the sum of the lower offset and of the longitudinal distance shift 19. This longitudinal dimension can be between 0.05 meter and 0.4 meter.

Moreover, the cut-out elevation step 18 is bent with respect to a transverse reference plane PREF that is parallel to the transverse direction Y and orthogonal to the longitudinal direction X, by a front-downwards/rear-upwards cut-out angle 21. Depending on embodiments; the cut-out angle 21 is comprised between 1 degree and 70 degrees. In preferred embodiments, the cut-out angle 21 is comprised between 20 degrees and 60 degrees, e.g. slightly similar to the angle of the tail fin leading edge 7.

A passing through opening 9 is made in the inclined surface of the cut-out elevation step 18. The passing through opening 9 faces forwards longitudinally the fore end 11.

So, the power transmission shaft 5 extends above the longitudinal median boom portion 12 from the fore end 11 to an entering region that corresponds to the passing through opening 9 9, in the cut-out elevation step 18.

According to the FIG. 4 embodiment, the tail rotor can be an external tail rotor.

Figure 5:
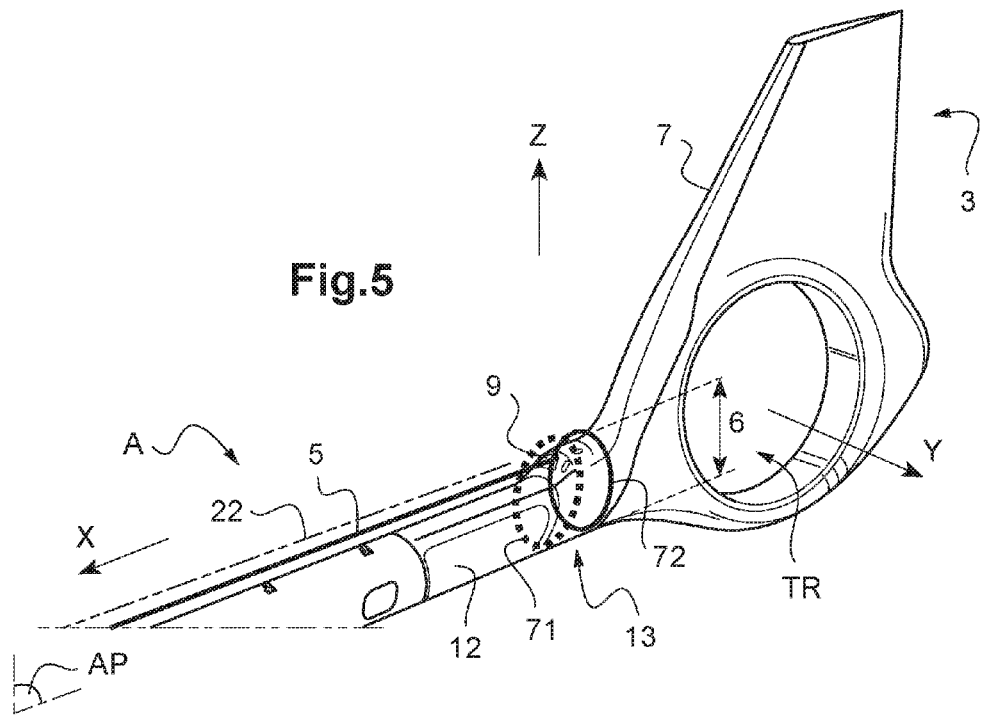

Nevertheless, and according to the FIG. 5, an embodiment of the tail assembly 1 includes a ducted tail rotor TR.

Moreover and whatever the embodiments are, the transition structure may comprise some structural frames 71, 72 at appropriate locations to increase the stiffness and the stability of the tail assembly. A frame 71 can be arranged in parallel of the cut-out elevation step 18. Another frame 72 can be arranged at the end of the longitudinal part. Some frames can be arranged in the tail fin 3 and/or in the longitudinal median boom portion 12.

Figure 6:
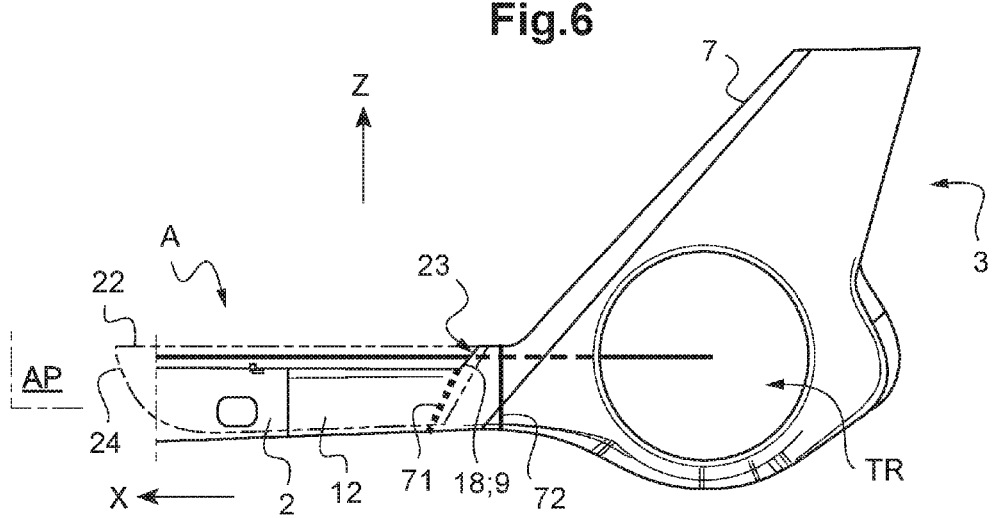

According to the FIG. 6 an independently of the embodiment, the power transmission shaft 5 can be covered by at least one non load-bearing fairing 22. The non load-bearing fairing 22 is arranged between the fore end and the cut-out elevation step 18. The non load-bearing fairing 22 is shaped with a horseshoe section when seen perpendicularly to the longitudinal direction X of the rotorcraft A. The non load-bearing fairing 22 may have at least one aft edge 23 that is slanted e.g. down-front to top-rear. The non load-bearing fairing 22 may also have at least one fore edge 24 that is slanted down-rear to top-front. For easy maintenance, in embodiments, the non load-bearing fairing 22 is detachably secured to the longitudinal median boom structure 12 for allowing access to the power transmission shaft 5.

According to the FIG. 7, at least two reinforcement ribs 25 are rigidly secured to the longitudinal median boom portion 12 and to the cut-out elevation step 18, with the power transmission shaft extending between the ribs. The ribs 25 may be designed integral with the tail boom 12 and/or with the transition structure 13 and/or with the tail fin 3.

According to the FIG. 8 and compared to the FIG. 3, the invention allows to obtain a larger section SE' in the area close to the tail fin leading edge 7. Consequently, the transition structure provides a smoother transition between the tail fin and the tail-boom thereby reducing the stress concentration in said section SE'.

Moreover, the transition structure allows offsetting forwards the passing through opening 9 at the smaller cross section change.

The FIG. 9 illustrates the manufacturing method M according to the invention. With this method M, manufacturing the tail assembly 1 includes:

a transition stage M1 of providing the tail assembly 1 with at least one transition structure 13 that is longitudinally arranged between the longitudinal median boom portion 12 and the tail fin 3;

a cut-out arrangement stage M2 of providing the transition structure 13 with at least one cut-out elevation step 18;

an upper location stage M3 of determining the longitudinal distance shift of the upper end of the cut-out elevation step 18;

a lower offset stage M4 of defining a lower offset of the cut-out elevation step 18.

With the transition stage M1, at least one transverse section of the transition structure is designed to have an upwards dimension that is higher than an elevation junction dimension of the longitudinal median boom portion at a junction between the longitudinal median boom portion and the transition segment;

With the cut-out arrangement stage M2 the transition structure 13 is made with at least one cut-out elevation step 18, in such a manner that the power transmission shaft extends at least partly externally above the longitudinal median part, from the fore end to an entering region in the cut-out elevation step M2, where is made the passing through opening;

A manufacturer positions the cut-out elevation step within the upper location stage M3 and lower offset stage M4.

According to embodiments, the method M includes an angle affecting stage M5. During the angle affecting stage M5, the value of the cut-out angle 21 is calculated according to which the cut-out elevation step 18 is bent, with respect to a transverse reference plane that is parallel to a transverse direction of the tail assembly 1 and orthogonal to a longitudinal direction X of the tail assembly 1.

According to the embodiment of FIG. 7, the method M further includes a reinforcement stage M6 using at least two reinforcement ribs 25.

Each ribs 25 extends and is rigidly secured to the longitudinal median boom 12, with the power transmission shaft 5 extending between the ribs 25. The method M then determines a lateral position P of each reinforcement rib including a sideward spacing value between the power transmission shaft 5 and the corresponding reinforcement rib 25.

The following table T1 is listing the references signs in the drawings.

LONGITUDINAL DIRECTION X
TRANSVERSE DIRECTION Y
ELEVATION DIRECTION Z
ROTORCRAFT A
MAIN ROTOR MR
ANTEROPOSTERIOR PLANE AP
MAIN ROTOR MR
ENGINE EN
CELL CE
TAIL ROTOR TR
LATERAL POSITION P
ELEVATION GAP G
TRANSVERSE REFERENCE PLANE PREF
DIRECT TRANSITION SECTION SE
LARGER SECTION SE'
METHOD M
TRANSITION STAGE M1
CUT-OUT ARRANGEMENT STAGE M2
UPPER LOCATION STAGE M3
LOWER OFFSET STAGE M4
TRANSITION LENGTH STAGE M5
ANGLE AFFECTING STAGE M6
TAIL ASSEMBLY 1
TAIL BOOM 2
TAIL FIN 3
AERODYNAMIC HORIZONTAL STABILIZER 4
POWER TRANSMISSION SHAFT 5
LEADING EDGE 7
LOAD BEARING STRUCTURE 8
PASSING THROUGH OPENING 9
SHARP CORNER 10
FORE END 11
LONGITUDINAL MEDIAN BOOM PORTION 12
TRANSITION STRUCTURE 13
TRANSVERSE SECTIONS 14, 15
UPWARDS DIMENSION 16
ELEVATION JUNCTION DIMENSION 17
CUT-OUT ELEVATION STEP 18
LONGITUDINAL DISTANCE SHIFT 19
LOWER OFFSET LOCATION 20
CUT-OUT ANGLE 21
NON LOAD-BEARING FAIRING 22
AFT EDGE 23
FORE EDGE 24
REINFORCEMENT RIBS 25
VERTICAL AERODYNAMIC STABILIZER 30
LOWER END 51

-continued

UPPER END 52
LONGITUDINAL PART 60
LONGITUDINAL DIMENSION 65
STRUCTURAL FRAMES 71
STRUCTURAL FRAMES 72
JUNCTION 100

The invention may be subjected to variations as to its implementation, said variations not being possibly identified exhaustively.

What is claimed is:

1. A method of manufacturing a tail assembly for a rotorcraft; the tail assembly including a power transmission shaft covered by at least one non-load bearing fairing and a load bearing structure defining, from fore to aft, a tail boom and a tail fin; the load bearing structure having a fore end and a longitudinal median boom portion extending from the fore end towards the tail fin; the tail assembly comprising a power transmission shaft penetrating inside the tail fin by a passing through opening in the load bearing structure; the passing through opening positioned on a surface of the load bearing structure facing the fore end;
wherein the method includes:
a transition stage of providing the load bearing structure of the tail assembly with at least one transition structure that is longitudinally arranged between the longitudinal median boom portion and the tail fin; the non-load bearing fairing being detachably secured to the longitudinal median boom portion for allowing access to the power transmission shaft and being flush with a longitudinal part of the transition structure; at least one transverse section of the transition structure having an upwards dimension that is higher than an elevation junction dimension of the longitudinal median boom portion at a junction between the longitudinal median boom portion and the transition structure;
a cut-out arrangement stage of providing the transition structure with at least one cut-out elevation step, the passing through opening being made in the cut-out elevation step, such that the power transmission shaft extends at least partly externally above the longitudinal median boom portion between the fore end and the cut-out elevation step, the power transmission shaft penetrating in the load bearing structure through the passing through opening;
an upper location stage of determining a longitudinal distance shift at which an upper end of the cut-out elevation step is longitudinally shifted forwards relative to a leading edge of the tail fin; and
a lower offset stage of defining a lower offset at which a lower end of the cut-out elevation step is longitudinally shifted forwards with respect to the upper end of the cut-out elevation step.

2. The method of manufacturing of claim 1, wherein a longitudinal dimension of the transition structure is comprised between 0.05 m and 0.4 m.

3. The method of manufacturing of claim 2, wherein the upper end of the cut-out elevation step is linked to a longitudinal part of the transition structure, the longitudinal part extending from the cut-out elevation step towards the leading edge of the tail fin.

4. The method of manufacturing of claim 1, wherein the method includes an angle affecting stage which consists in providing a front—downwards/rear—upwards cut-out angle according to which the cut-out elevation step is bent with respect to a transverse reference plane (PREF) that is parallel to a transverse direction of the tail assembly and orthogonal to a longitudinal direction of the tail assembly; the cut-out angle being comprised between 1 degree and 70 degrees.

5. The method of manufacturing of claim 1, wherein the method includes a reinforcement stage during which stage at least two reinforcement ribs are rigidly secured to the longitudinal median boom portion and to the cut-out elevation step, with the power transmission shaft extending between the ribs; the method including a stage of determining a lateral position of each reinforcement rib including a sideward spacing value between the power transmission shaft and the corresponding reinforcement rib.

6. A tail assembly for a rotorcraft, the tail assembly including a load bearing structure defining, from fore to aft, a tail boom and a tail fin; the load bearing structure having a fore end and a longitudinal median boom portion extending from the fore end towards the tail fin; the tail assembly comprising a power transmission shaft which penetrates inside the tail fin by a passing through opening in the load bearing structure; the passing through opening positioned on a surface of the load bearing structure facing the fore end; wherein the power transmission shaft is covered by at least one non-load bearing fairing; wherein the tail assembly includes: at least one transition structure provided in the tail assembly; the transition structure being longitudinally arranged between the longitudinal median boom portion and the tail fin; the non-load bearing fairing being detachably secured to the longitudinal median boom portion for allowing access to the power transmission shaft and being flush with a longitudinal part of the transition structure; at least one transverse section of the transition structure having an upwards dimension that is higher than an elevation junction dimension of the longitudinal median boom portion at a junction between the longitudinal median boom portion and the transition structure; at least one cut-out elevation step being arranged on the transition structure, the passing through opening being made in the cut-out elevation step, such that the power transmission shaft extends at least partly externally above the longitudinal median boom portion, between the fore end and the cut-out elevation step, the power transmission shaft penetrating in the load bearing structure through the passing through opening; the cut-out elevation step having an upper end which is longitudinally shifted forwards relative to a leading edge of the tail fin, the cut-out elevation step having a lower end which is longitudinally shifted forwards with respect to the upper end.

7. The tail assembly of claim 6, wherein the tail assembly includes an external tail rotor.

8. The tail assembly of claim 6, wherein the tail assembly includes a ducted tail rotor.

9. The tail assembly of claim 6, wherein the transition structure is at least partly a part of the longitudinal median boom portion.

10. The tail assembly of claim 6, wherein characterized in that the transition structure is at least partly a part of the tail fin.

11. The tail assembly of claim 6, wherein the cut-out elevation step is bent with respect to a transverse reference plane that is parallel to a transverse direction of the tail assembly and orthogonal to a longitudinal direction of the tail assembly by a front—downwards/rear—upwards cut-out angle; the cut-out angle being comprised between 1 degree and 70 degrees.

12. The tail assembly of claim 11, wherein the upper end is linked to a longitudinal part of the transition structure, the longitudinal part extending from the cut-out elevation step towards the leading edge of the tail fin.

13. The tail assembly of claim 6, wherein the non load-bearing fairing is shaped with a horseshoe section perpendicularly to the longitudinal direction of the rotorcraft, and wherein at least one of a fore edge and an aft edge of the non load-bearing fairing being slanted.

14. A rotorcraft, wherein the rotorcraft includes at least one tail assembly according to claim 6.

15. A rotorcraft, wherein the rotorcraft includes at least one tail assembly according to claim 7.

16. A rotorcraft, wherein the rotorcraft includes at least one tail assembly according to claim 8.

17. A rotorcraft tail assembly comprising:
a load bearing structure having a tail boom with a longitudinal median boom portion, a tail fin, and a transition structure positioned longitudinally between and connecting the longitudinal median boom portion to the tail fin, wherein the transition structure has a cut-out elevation step and to a longitudinal part, the cut-out elevation step defining a passing through opening, wherein the cut-out elevation step has an upper end shifted longitudinally forward of a leading edge of the tail fin and a lower end shifted longitudinally forward of the upper end and connected to the longitudinal median boom portion at a junction, wherein the cut-out elevation step extends upwardly in elevation from the longitudinal median boom portion such that the transition structure has an upwards dimension that is higher than an elevation at the junction and such that the longitudinal part is offset in elevation from the longitudinal median boom portion, and wherein the longitudinal part of the transition structure extends longitudinally aftward from the upper end of the cutout elevation step to the leading edge of the tail fin;

a power transmission shaft extending along the tail boom, the power transmission shaft extending longitudinally above the longitudinal median boom portion, through the passing through opening of the transition structure, and into an inside region of the tail fin; and a non-load bearing fairing detachably secured to the longitudinal median boom portion to cover the power transmission shaft and allow access to the power transmission shaft, the non-load bearing fairing extending from the transition structure towards a fore end of the tail boom, wherein an upper surface of the non-load bearing fairing is flush with the longitudinal part of the transition structure.

18. The rotorcraft tail assembly of claim 17 wherein the non-load bearing fairing has a horseshoe-shaped cross-section, a fore edge that is slanted top-front to down-rear, and a rear edge that is slanted down-front to top-rear, wherein a slant angle of the rear edge corresponds with an angle of the cut-out elevation step.

19. The rotorcraft tail assembly of claim 17 wherein the power transmission shaft is arranged in elevation between an upper surface of the longitudinal median boom portion and the non-load bearing fairing.

20. The rotorcraft tail assembly of claim 17 further comprising first and second reinforcement ribs, each rib connected to the cut-out elevation step and to an outer surface of the longitudinal median boom portion, each rib extending longitudinally from the cut-out elevation step towards a fore end of the tail boom, and wherein the power transmission shaft is positioned between the first and second reinforcement ribs.

* * * * *